US009509596B2

(12) United States Patent
Bergman et al.

(10) Patent No.: US 9,509,596 B2
(45) Date of Patent: Nov. 29, 2016

(54) DOMAIN NAME SYSTEM BYPASS IN USER APPLICATIONS

(71) Applicant: Fastly, Inc., San Francisco, CA (US)

(72) Inventors: Artur Bergman, San Francisco, CA (US); Simon Wistow, Oakland, CA (US); Tyler McMullen, San Francisco, CA (US)

(73) Assignee: Fasly, Inc., San Francisco, CA (US)

( * ) Notice: Subject to any disclaimer, the term of this patent is extended or adjusted under 35 U.S.C. 154(b) by 153 days.

(21) Appl. No.: 14/297,098

(22) Filed: Jun. 5, 2014

(65) Prior Publication Data

US 2014/0365683 A1 Dec. 11, 2014

Related U.S. Application Data

(60) Provisional application No. 61/832,604, filed on Jun. 7, 2013.

(51) Int. Cl.
| | | |
|---|---|---|
| *G06F 15/173* | (2006.01) | |
| *H04L 12/721* | (2013.01) | |
| *H04L 29/12* | (2006.01) | |
| *H04L 29/08* | (2006.01) | |
| *G06F 17/30* | (2006.01) | |
| *H04L 12/26* | (2006.01) | |

(52) U.S. Cl.
CPC ......... *H04L 45/34* (2013.01); *G06F 17/30902* (2013.01); *H04L 61/1511* (2013.01); *H04L 61/6009* (2013.01); *H04L 67/2833* (2013.01); *H04L 67/2852* (2013.01); *H04L 43/0852* (2013.01)

(58) Field of Classification Search
CPC .................. H04L 29/12066; H04L 29/12641; H04L 45/34; H04L 61/1511; H04L 63/062

USPC .......................................... 709/217, 232, 238
See application file for complete search history.

(56) References Cited

U.S. PATENT DOCUMENTS

| | | | | |
|---|---|---|---|---|
| 6,125,395 | A * | 9/2000 | Rosenberg ........ | G06F 17/30873 707/999.1 |
| 7,162,540 | B2 * | 1/2007 | Jasen ...................... | H04L 47/10 709/242 |
| 8,224,994 | B1 * | 7/2012 | Schneider .............. | G06Q 30/02 709/217 |
| 8,914,543 | B2 * | 12/2014 | Jasen ...................... | H04L 47/10 370/338 |

(Continued)

FOREIGN PATENT DOCUMENTS

WO          0129684 A1     4/2001

OTHER PUBLICATIONS

Crovella et al. "Dynamic Server Selection in the Internet." Computer Science Department, Boston University. Jun. 30, 1995.

(Continued)

*Primary Examiner* — Kristie Shingles

(57) ABSTRACT

Disclosed herein are methods, systems, and software for bypassing a domain name system. In one example, a method of operating a user communication device includes receiving a user instruction requesting content within a user application of the user communication device. The method further provides, in response to the user instruction, processing at least a domain name system bypass data structure on the user communication device to identify a network address for retrieving the content. The method further includes, requesting the content from a content node using the network address.

18 Claims, 5 Drawing Sheets

(56) References Cited

U.S. PATENT DOCUMENTS

| | | | |
|---|---|---|---|
| 2002/0019879 A1* | 2/2002 | Jasen | H04L 47/10 709/240 |
| 2004/0167982 A1* | 8/2004 | Cohen | G06F 17/30876 709/226 |
| 2006/0253609 A1 | 11/2006 | Andreev et al. | |
| 2008/0181124 A1 | 7/2008 | Chari | |
| 2012/0191836 A1 | 7/2012 | Ogata | |

OTHER PUBLICATIONS

"Method and System for Client Side Resilient Cloud Computing." IP.com Journal. Feb. 18, 2009.

Moore, Keith. "Sonar—A Network Proximity Service Version 1." Aug. 4, 1998.

Mockapetris, P. "Domain Names—Implementation and Specification." Network Working Group. 1987.

* cited by examiner

DOMAIN NAME SYSTEM BYPASS IN USER APPLICATIONS

RELATED APPLICATIONS

This application hereby claims the benefit of and priority to U.S. Provisional Patent Application 61/832,604, titled "DOMAIN NAME SYSTEM BYPASS IN USER APPLICATIONS," filed Jun. 7, 2013, and which is hereby incorporated by reference in its entirety.

TECHNICAL BACKGROUND

Network-provided content, such as Internet web pages or media content such as video, pictures, music, and the like, are typically served to end users via networked computer systems. End user requests for the network content are processed and the content is responsively provided over various network links. These networked computer systems can include origin hosting servers which originally host network content of content creators or originators, such as web servers for hosting a news website. However, these computer systems of individual content creators can become overloaded and slow due to frequent requests of content by end users.

Content delivery networks have been developed that add a layer of caching between the origin servers of the content providers and the end users. The content delivery networks typically have one or more content nodes distributed across a large geographic region to provide faster and lower latency access to the content for the end users. When end users request content, such as a web page, the content node is configured (typically through domain name systems or DNS) to respond to the end user requests instead of the origin servers. Domain name systems provide translations of domain names into IP addresses allowing a content node to act as a proxy for the origin servers.

Content of the origin servers can be cached into the content nodes, and can be requested via the content nodes from the origin servers of the content originators when the content has not yet been cached. Content nodes usually cache only a portion of the original source content rather than caching all content or data associated with an original content source. The content nodes can maintain only recently accessed and most popular content as cached from the original content sources. Thus, content nodes exchange data with the original content sources when the end users request requires new or un-cached information or if something has changed in the original content source data.

OVERVIEW

Examples disclosed herein provide methods, systems, and software for domain name system bypassing. In one example, a method of operating a user communication device includes receiving a user instruction requesting content within a user application of the user communication device. The method further provides, in response to the user instruction, processing at least a domain name system (DNS) bypass data structure on the user communication device to identify a network address for retrieving the content. The method further includes, requesting the content from a content node using the network address.

In another instance, a computer readable medium having program instructions stored thereon that, when executed by a user communication device, direct the user communication device to at least receive a user instruction requesting content within a user application executed on the user communication device. In response to the user instruction, the program instructions further direct the user communication device to process at least a DNS bypass data structure on the user communication device to identify a network address for retrieving the content, and request the content from a content node using the network address.

In another example, a system for domain name system bypassing includes a DNS bypass system configured to transfer DNS bypass information to a user communication device. The system further includes the user communication device configured to insert the DNS bypass information into a DNS bypass data structure and receive a user instruction requesting content within a user application executed on the user communication device. In response to the content request, the user device is configured to process at least the DNS bypass data structure on the user communication device to identify a network address for retrieving the content, and request the content from a content node using the network address.

BRIEF DESCRIPTION OF THE DRAWINGS

The following description and associated figures teach the best mode of the invention. For the purpose of teaching inventive principles, some conventional aspects of the best mode can be simplified or omitted. The following claims specify the scope of the invention. Note that some aspects of the best mode cannot fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

DESCRIPTION

Network content, such as web page content, typically includes content such as text, hypertext markup language (HTML) pages, pictures, video, audio, code, scripts, or other content viewable by an end user in a browser or other application. This various network content can be stored and served by origin servers and equipment. The network content includes example website content referenced in FIG. 1, such as "www.gamma.gov," "www.alpha.com," and "www.beta.net," among others. In some examples, origin servers can serve the content to end user devices. However, when a content delivery network (CDN) or other content delivery system is employed, the content delivery network can act as a proxy to cache content delivery between origin servers and the end user devices.

Content delivery networks can add a layer of caching between origin servers of the content providers and the end users. The content delivery networks typically have one or more content nodes or cache nodes distributed across a large geographic region to provide faster and lower latency local access to the content for the end users. When end users request content, such as a web page, a locally proximate content node will respond to the content request instead of the associated origin server. Various techniques can be employed to ensure the content node responds to content requests instead of the origin servers, such as associating web content of the origin servers with network addresses of the content nodes instead of network addresses of the origin servers using domain name system (DNS) registration and lookup procedures. DNS registration is an Internet service that translates domain names into IP addresses. For example, user devices that request data from a webpage, such as www.example.com, must first request the DNS service to find the appropriate network address that corresponds to the domain name. This querying of the DNS service takes time, as the user device must look externally for the appropriate network address.

Figure 1:
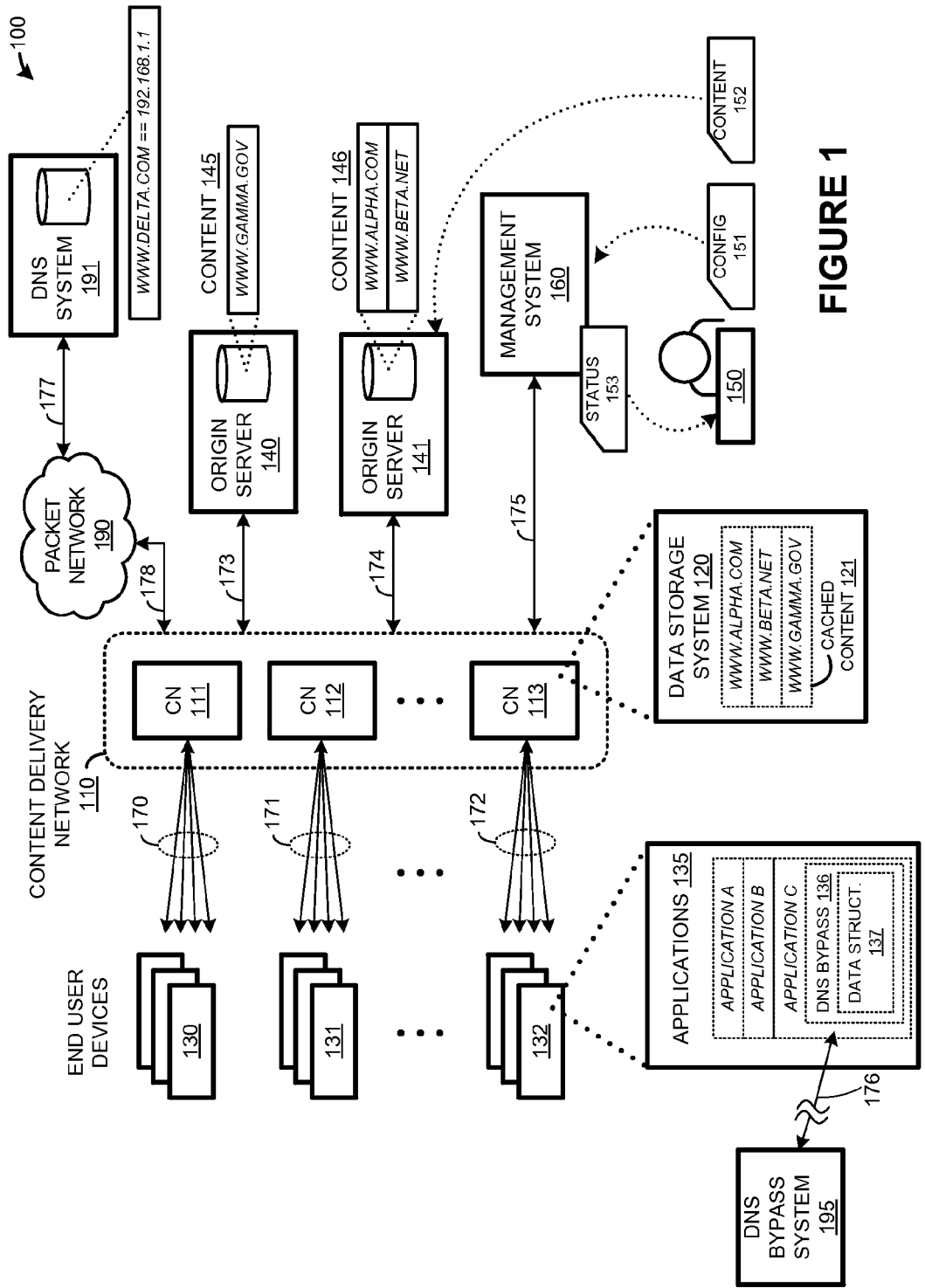
FIG. 1 is a system diagram illustrating a communication system.

FIG. 1 illustrates a content delivery communication system 100 according to one example. Communication system 100 includes content delivery network 110, end user devices 130-132, origin servers 140-141, management system 160, packet network 190, DNS system 191, and DNS bypass system 195. Content delivery network 110 includes one or more content nodes (CN) 111-113. Each of CN 111-113 can include one or more data storage systems, such as that illustrated for CN 113 as data storage system 120. End user devices 130-132 are representative of a plurality of end user communication devices that can request and receive network content. It should be understood that any number of end user devices 130-132 can be associated with each of content nodes 111-113. CN 111-113 and end users 130-132 communicate over associated network links 170-172. Content delivery network 110 and origin servers 140-141 communicate over associated network links 173-174. Content delivery network 110 and management system 160 communicate over link 175. User device 132 and DNS bypass system 195 communicate over link 176. Packet network 190 communicates with Content delivery network 110 using communication link 178, and further communicates with DNS system 191 using communication link 177. Although not shown in FIG. 1 for clarity, each of CN 111-113 can also communicate with each other over network links.

To further illustrate FIG. 1, a brief description of the operation of communication system 100 is included. In operation, end user devices 130-132 request network content, such as content 145-146 associated with origin servers 140-141. Instead of these requests being handled by the individual origin servers 140-141, individual content nodes 111-113 of content delivery network 110 receive the content requests over one of links 170-172 and process the content requests for delivery of the content to the associated end user devices 130-132. Requested network content that is already stored in ones of CN 111-113 can be provided quickly to the end user devices, while network content that is not already stored in ones of CN 111-113 can be responsively requested by an associated one of CN 111-113 from an appropriate origin server 140-141 for delivery by the CN and possible caching by the CN. In this manner, each of CN 111-113 can act as intermediary proxy nodes to provide local and fast access for end user devices 130-132 to network content of origin servers 140-141 without burdening origin servers 140-141. FIG. 1 shows cached content 121 included in data storage system 120 of CN 113 as comprised of content 145-146, and thus content 145-146 is currently shown as cached by CN 113. Other configurations are possible, including subsets of content 145-146 being cached in individual ones of CN 111-113.

Although FIG. 1 shows content 145-146 of origin servers 140-141 being cached by data storage system 120, CN 111-113 can handle other content. For example, dynamic content generated by activities of end user devices 130-132 need not originally reside on origin servers 140-141, and can be generated due to scripting or code included in web page content delivered by CN 111-113. This dynamic content can also be cached by ones of CN 111-113, and can be specific to a particular end user device during a communication session.

Packet network 190 can communicatively couple DNS system 191 with content delivery network 110. In some examples, when end user devices 130-132 desire content from a domain name or uniform resource locator (URL), user devices 130-132 will contact a DNS system, such as DNS system 191, to translate alphanumeric domain names and URLs to numerical network address. As demonstrated in FIG. 1, if one of user device 130-132 requests content from www.delta.com, a DNS lookup request is transferred by the one of user device 130-132 for delivery to DNS system 191. DNS system 191 then responsively returns a network address that corresponds to the domain name. From this numerical address, a content request can then be made to the appropriate CN 111-113 or other server associated with the network address received from DNS system 191. In many examples, the network address comprises an Internet protocol (IP) address, such as indicated by 192.168.1.1 associated with www.delta.com in FIG. 1.

As illustrated in FIG. 1, user devices such as end user device 132 can include applications 135 that receive content from content delivery network 110. In the present example, such applications include Application A, Application B, and Application C. When Application A and Application B require content, user device 132 will use a DNS request to DNS system 191 to determine the network address of the appropriate content. However, Application C includes DNS bypass module 136 to avoid the DNS request to DNS system 191, in contrast to Application A and Application B.

Instead of using the DNS system, DNS bypass module 136 can update a DNS bypass data structure 137 with CN access information for Application C. This access information comprises network address information prioritized within the data structure based on various access factors discussed herein. The access factors can include which CNs are closest in physical location or network proximity to user device 132, which CNs are available to serve content to user device 132, which CNs provide the least amount of latency for user device 132, or any other distinction for determining the appropriate priority for the CNs, including combinations thereof. DNS bypass data structure 137 can include a list of the prioritized CNs or any other data structure capable of prioritizing the CNs. Updating of DNS bypass data structure 137 can occur on a given period such as every ten minutes, every time a new CN is made available to the user device, every time the application is executed on the device, or any other predetermined, event-driven, or periodic update schedule. By maintaining a local prioritized DNS bypass data structure 137 for Application C, the application is capable of requesting content from the appropriate CN without a DNS query to DNS system 191 or other DNS systems.

DNS bypass system 195 is configured to communicate with user device 132 to update user device 132 with DNS bypass information, such as possible CN network addresses for Application C. The user device can test or otherwise evaluate the network addresses from DNS bypass system 195 to create a prioritized order in the data structure. In some examples, DNS bypass system 195 can be configured to test access factors, such as the availability and latency of the CNs with other user devices to assist user device 132 in prioritizing the network addresses. Although not illustrated for simplicity, it should be understood that DNS bypass system 195 can communicate with CNs 111-113 or management system 160.

In some instances, DNS bypass module 136 can include a software development kit (SDK) or application programming interface (API) that allows user device 132 to communicate with DNS bypass system 195. The SDK or API can be configured to receive and store network addresses for the one or more CNs into DNS bypass data structure 137, request network addresses for the one or more CNs, prioritize the CNs in DNS bypass data structure 137, or any other process for storing and arranging items within DNS bypass structure 137.

Management system 160 handles configuration changes and status information collection and delivery for system operators and for the origin server operators or managers. For example, operator device 150 can transfer configuration 151 for delivery to management system 160, where configuration 151 can alter the handling of network content requests by CN 111-113, among other operations. Also, management system 160 can monitor status information for the operation of CN 111-113, such as operational statistics, and provide this status information as 153 to operator device 150. Furthermore, operator device 150 can transfer content 152 for delivery to origin servers 140-141 to include in content 145-146. Although one operator device 150 is shown in FIG. 1, it should be understood that this is merely representative and communication system 100 can include many operator devices for receiving status information, providing configuration information, or transferring content to origin servers. In some examples, management system 160 can be combined with DNS bypass system 195. In other examples, management system 160 or DNS bypass system 195 can be combined with elements of content delivery network 110.

Figure 2:
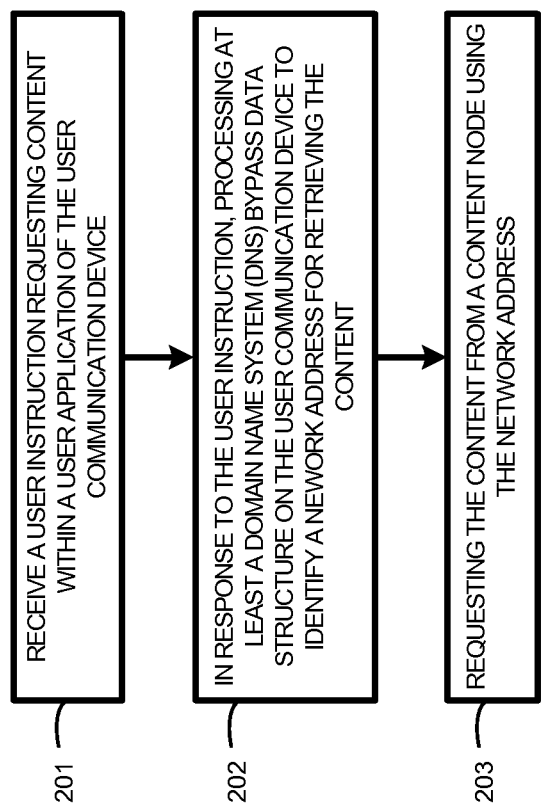
FIG. 2 is a flow diagram illustrating a method of operation of an end user device.

FIG. 2 illustrates a method of operating user device 132. End user device 132 receives a user instruction requesting content within a user application of the user communication device (201). The content requested for the user device can include news content, media content, web page content, social media content, or other content such as text, video, pictures, music, and the like. Further, the user application can include applications such as social media applications, media streaming applications, news reading applications, and other similar applications. However, the application is not a web browser, such as Google Chrome, Apple Safari, Mozilla Firefox, Opera, or Microsoft Internet Explorer in this example. Thus, the user instruction requesting content in this example does not comprise a user entering a domain name or URL into a user interface element of the user application.

In response to the user instruction, end user device 132 processes at least DNS bypass data structure 137 on user device 132 to identify a network address for retrieving the content (202). In some examples, DNS bypass data structure 137 includes network addresses for one or more content nodes. The network address indicated for a highest priority content node can be identified to retrieve the content requested by the user instruction.

In some examples, DNS bypass module 136 on user device 132 can prioritize items in the data structure, such as the network addresses, based on various access factors of content nodes in the system. For instance, DNS bypass module 136 can prioritize based on a physical location or network closeness of a content node, an access latency with regards to the content node, an ability of the content node to serve content to the end user device, or other factors, including combinations thereof. DNS bypass data structure 137 can be updated every time the user executes the application, can be updated at set time increments, or can updated in any other periodic, event-driven, or predetermined way.

In some examples, DNS bypass data structure 137 can receive updates from DNS bypass system 195. DNS bypass system 195 can be configured to communicate with user device 132 to update user device 132 with DNS bypass information, such as network addresses for content nodes. The updates can allow user device 132 to configure and test the network addresses to create the prioritized data structure. In some examples, DNS bypass system 195 can be configured to further test the availability and latency of the content nodes to assist the user device in prioritizing the network addresses.

Responsive to identification of the network address, user device 132 will request the content from a content node using the network address identified above (203). In some examples, the highest priority content node can be unavailable or unreachable. In these situations, the user device can then select the next network address within DNS bypass data structure 137 to obtain the requested content. This process can then be repeated as many times as necessary until the requested content is returned to the end user device. Furthermore, based on the response of the content nodes during content requests, DNS bypass data structure 137 can be updated based on a variety of access factors. These access factors can include the availability of the CNs, the latency of the CNs, the location of the CNs, or any other CN access factor, including combinations thereof.

Referring back to the elements of FIG. 1, CN 111-113, origin servers 140-141, management system 160, packet network 190, DNS system 191 and DNS bypass system 195 can each include communication interfaces, network interfaces, processing systems, computer systems, microprocessors, storage systems, storage media, or some other processing devices or software systems, and can be distributed among multiple devices. Examples of CN 111-113, origin servers 140-141, management system 160, packet network 190, DNS system 191, and DNS bypass system 195 can each include software such as an operating system, logs, databases, utilities, drivers, caching software, networking software, and other software stored on a computer-readable medium. Content delivery network 110, in addition to including CN 111-113, can include equipment and links to route communications between CN 111-113 and any of end user devices 130-132, origin servers 140-141, management system 160, packet network 190, DNS system 191 and DNS bypass system 195, among other operations.

End user devices 130-132 can include subscriber equipment, customer equipment, access terminal, smartphone, personal digital assistant (PDA), computer, tablet computing device, e-book, Internet appliance, media player, game console, or some other user communication apparatus, including combinations thereof. End user devices 130-132 include storage media for storing DNS bypass data structures similar to DNS bypass data structure 137. These data structures allow user devices 130-132 to make content requests without inquiries to a DNS system similar to DNS system 191.

Communication links 170-178 each use metal, glass, optical, air, space, or some other material as the transport media. Communication links 170-176 can each use various communication protocols, such as Time Division Multiplex (TDM), asynchronous transfer mode (ATM), Internet Protocol (IP), Ethernet, synchronous optical networking (SONET), hybrid fiber-coax (HFC), circuit-switched, communication signaling, wireless communications, or some other communication format, including combinations, improvements, or variations thereof. Communication links 170-178 can each be a direct link or can include intermediate networks, systems, or devices, and can include a logical network link transported over multiple physical links. Although one main link for each of links 170-178 is shown in FIG. 1, it should be understood that links 170-178 are merely illustrative to show communication modes or access pathways. In other examples, further links can be shown, with portions of the further links shared and used for different communication sessions or different content types, among other configurations. Communication links 170-178 can each include many different signals sharing the same associated link, as represented by the associated lines in FIG. 1, comprising resource blocks, access channels, paging channels, notification channels, forward links, reverse links, user communications, communication sessions, overhead communications, carrier frequencies, other channels, timeslots, spreading codes, transportation ports, logical transportation links, network sockets, packets, or communication directions.

Figure 3:
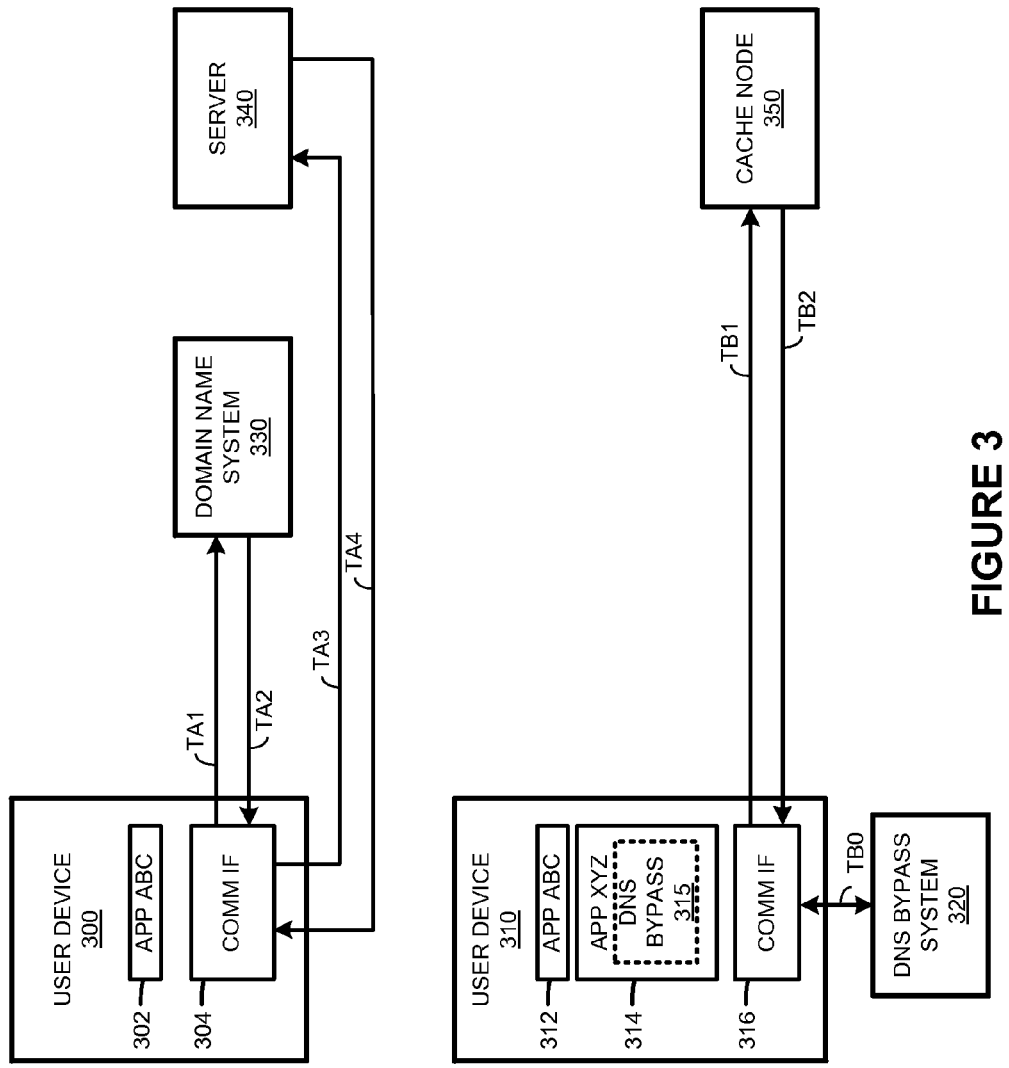
FIG. 3 is a block diagram illustrating content requests from end user devices.

FIG. 3 illustrates content requests from user communication devices. FIG. 3 includes user device 300, user device 310, DNS bypass system 320, domain name system 330, server 340, and cache node 350. User device 300 communicates with domain name system 330 and server 340 using communication interface 304. User device 310 communicates with DNS bypass system 320 and cache node 350 using communication interface 316. Cache node 350 can comprise a content node, such as any of content nodes 111-113 of FIG. 1, although variations are possible.

In the operation of user device 300, applications, such as application ABC 302, can request content from network devices such as server 340 using a browser application which a user has entered a domain name or URL to request content. To gather the content from server 340, user device 300 must first request, from domain name system 330 (time TA1), the network address associated with the domain name or URL requested by the user of user device 300. Typically, domain name system 330 translates alphanumeric domain names to numerical network addresses needed for the purpose of locating network devices, such as server 340. Once domain name system 330, has determined the appropriate network address for the domain name or URL, domain name system 330 will return the appropriate network address to user device 304 (time TA2).

Upon receipt of the network address, user device 300 can then issue a content request to server 340 for the user requested content for application ABC (time TA3). Server 340 can then return the requested content for application ABC, if server 340 is available (time TA4).

In contrast to application 302, user device 310 includes application XYZ 314 with DNS bypass capability. Application 314 can include social media applications, video streaming applications, music streaming applications, news reading applications, and other user applications. However, application 314 is not a web browser in this example. Also, a user entry of a domain name or URL is also not considered a user request for content in this example. Instead, a user can request content using various graphical user interface elements, such as icons, pictures, text, buttons, or other user interface elements to select or request content within application 314.

In operation, user device 310 can be updated with network addresses for one or more cache nodes by DNS bypass system 320 (time TB0). These network addresses will then be prioritized and stored within a DNS bypass data structure 315 on user device 310 such that when application 314 requests content, user device 310 can use a network address in DNS bypass data structure 315. Thus, instead of requesting a network address from a domain name system at the time of a user request for content, user device 310 can access DNS bypass data structure 315 locally to identify the appropriate network address. The network address can then be used to make a request to the appropriate cache nodes (time TB1), such as cache node 350, and cache node 350 can return the appropriate content (time TB2).

In determining the priority within DNS bypass data structure 315, user application XYZ can consider the location of a content node, the latency with regards to the content node, the ability for the content node to serve content to the end user device, or any other method of prioritizing items in a DNS bypass data structure, as discussed herein. Further, DNS bypass data structure 315 can be updated every time the user executes the application, can be updated at set time increments, or can be updated in any other periodic or systematic way. In some instances, DNS bypass data structure 315 can comprise a list, but the prioritizing information can be stored in any other data form capable of prioritizing the network addresses. In some cases, DNS bypass structure 315 can be updated based on the response of cache nodes during a content request. Thus, if a cache node suddenly became unavailable or slow, that cache node can be given a lower priority for the next content request.

In some examples, DNS bypass system 320 can be used to assist user device 310 in prioritizing the cache node addresses. In such instances, DNS bypass system can consider access factors such as the availability as well as the latency for the available cache nodes. DNS bypass system 320 can accumulate statistical data from other user devices to assist prioritizing of DNS bypass data structure 315. Such statistical data can include the latency, location, success rates, and availability of cache nodes upon content requests for other user devices. DNS bypass system 320 can then process the statistical data to assist user device in generating a prioritized DNS bypass data structure 315, such as by sorting or prioritizing a list of network addresses before transfer of the list to user device 310.

Figure 4:
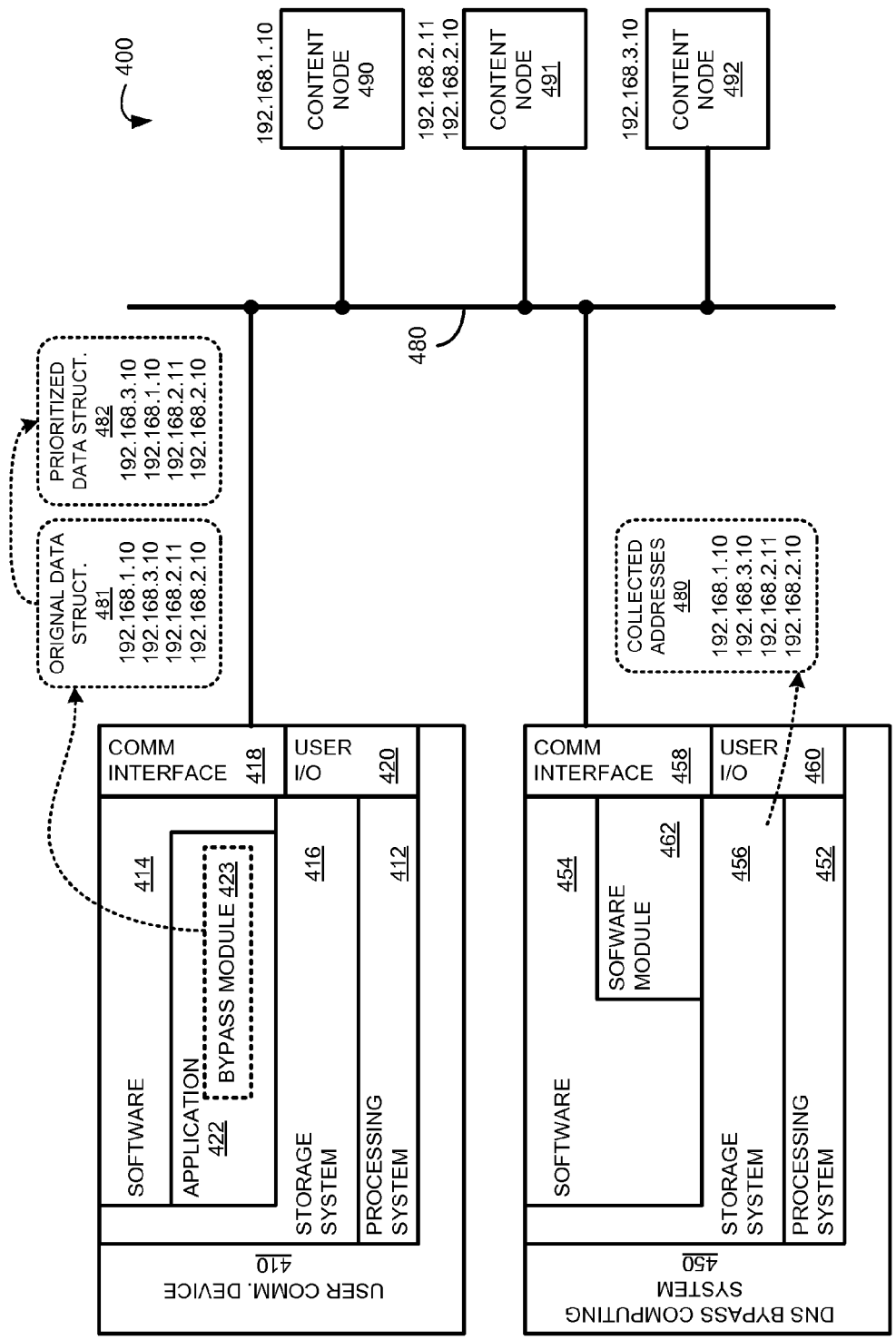
FIG. 4 is a system diagram illustrating a domain name system bypass environment.

FIG. 4 illustrates a domain name system bypass environment 400 according to one example. Environment 400 includes user communication device 410, DNS bypass computing system 450, communication network 480, and content nodes 490-492. User communication device 410 can be an example of end user device 132, and DNS bypass computing system 450 can be an example of DNS bypass system 195, although variations are possible.

User device 410 includes processing system 412, software 414, application 422, storage system 416, communication interface 418, and user interface 420. Processing system 412 loads and executes software 414, including application 422, from storage system 416. When executed by user communication device 410, application 422 directs processing system 412 to operate as a user communication device described herein.

In one example, application 422 can encounter a request or instruction from a user of the user communication device for content from within application 422. Upon the request, application 422 directs processing system 412 to process a domain name system bypass data structure (represented by bypass module 423 in FIG. 4) to identify a network address for retrieving content associated with the content request. Further, application 422 directs processing system 412 to request the content from a content node using the network address.

In some instances, application 422 can include a software development kit (SDK) or application programming interface (API) that allows user communication device 410 to communicate with DNS bypass computing system 450. The SDK or API can be configured to receive and store network addresses for the one or more CNs in a bypass data structure (represented by original data structure 481), request network addresses for the one or more CNs, prioritize the CNs in a bypass data structure (represented by prioritized data structure 482), or any other process for storing and prioritizing items within a DNS bypass structure.

Communication interface 418 can be configured to receive content from content nodes 490-492 and network addresses for CNs from DNS bypass computing system 450. Communication interface 418 can also be configured to request content for user communication device 410.

Referring still to FIG. 4, processing system 412 can comprise a microprocessor and other circuitry that retrieves and executes software 414 from storage system 416. Processing system 412 can be implemented within a single processing device but can also be distributed across multiple processing devices or sub-systems that cooperate in executing program instructions. Examples of processing system 412 include general-purpose central processing units, application specific processors, and logic devices, as well as any other type of processing device, combinations of processing devices, or variations thereof.

Storage system 416 can comprise any non-transitory storage media readable by processing system 412 and capable of storing software 414. Storage system 416 can include volatile and nonvolatile, removable and non-removable media implemented in any method or technology for storage of information, such as computer readable instructions, data structures, program modules, or other data. Storage system 416 can be implemented as a single storage device but can also be implemented across multiple storage devices or sub-systems. Storage system 416 can comprise additional elements, such as a controller, capable of communicating with processing system 412.

Examples of storage media include random access memory, read only memory, magnetic disks, optical disks, flash memory, virtual memory and non-virtual memory, magnetic cassettes, magnetic tape, magnetic disk storage or other magnetic storage devices, or any other medium which can be used to store the desired information and that can be accessed by an instruction execution system, as well as any combination or variation thereof, or any other type of storage media. In some implementations, the storage media can be a non-transitory storage media.

User interface 420 can include a mouse, a keyboard, a voice input device, a touch input device for receiving a gesture from a user, a motion input device for detecting non-touch gestures and other motions by a user, and other comparable input devices and associated processing elements capable of receiving user input or user instructions. Output devices such as a video display or graphical display, speakers, printer, haptic devices, and other types of output devices can also be included in user interface 420.

DNS bypass computing system 450 includes processing system 452, software 454, software module 462, storage system 456, communication interface 458, and user interface 460. Processing system 452 loads and executes software 414, including software module 462, from storage system 416. When executed by computing system 450, software module 462 directs processing system 452 to operate as a DNS bypass system described herein. In one example, software module 462 is configured to pass DNS bypass information to user communication device 410.

Communication interface 458 can be configured to communicate DNS bypass information, such as CN network addresses, to user communication device 410. Communication interface 458 can further be configured to gather network addresses for one or more content nodes. In some instances, communication interface 458 can be configured to receive prioritizing information from CNs 490-492.

Referring still to FIG. 4, processing system 452 can comprise a microprocessor and other circuitry that retrieves and executes software 454 from storage system 456. Processing system 452 can be implemented within a single processing device, but can also be distributed across multiple processing devices or sub-systems that cooperate in executing program instructions. Examples of processing system 452 include general-purpose central processing units, application specific processors, and logic devices, as well as any other type of processing device, combinations of processing devices, or variations thereof.

Storage system 456 can comprise any non-transitory storage media readable by processing system 452 and capable of storing software 454. Storage system 456 can include volatile and nonvolatile, removable and non-removable media, implemented in any method or technology for storage of information, such as computer readable instructions, data structures, program modules, or other data. Storage system 456 can be implemented as a single storage device, but can also be implemented across multiple storage devices or sub-systems. Storage system 456 can comprise additional elements, such as a controller, capable of communicating with processing system 452.

Examples of storage media include random access memory, read only memory, magnetic disks, optical disks, flash memory, virtual memory, and non-virtual memory, magnetic cassettes, magnetic tape, magnetic disk storage or other magnetic storage devices, or any other medium which can be used to store the desired information, and that can be accessed by an instruction execution system, as well as any combination or variation thereof, or any other type of storage media. In some implementations, the storage media can be a non-transitory storage media.

User interface 460 can include a mouse, a keyboard, a voice input device, a touch input device for receiving a gesture from a user, a motion input device for detecting non-touch gestures and other motions by a user, and other comparable input devices and associated processing elements capable of receiving user input from a user. Output devices such as a video display or graphical display, speakers, printer, haptic devices, and other types of output devices can also be included in user interface 460. User interface 460 can be omitted in some examples.

To further illustrate the operation of domain name system bypass environment 400, a brief description of prioritizing the network addresses for CN 490-492 is included. As illustrated in FIG. 4, CN 490-492 can have one or more associated network addresses that can be used to serve content to user communication device 410. In this example, the network addresses are IP addresses. In operation, these network addresses will be gathered by DNS bypass computing system 450 to form collected addresses 480, which will be transferred to user communication device 410. Once transferred to user communication device 410, the network addresses will be stored in original data structure 481 by bypass module 423. Once stored in original data structure 481, bypass module 423 can prioritize the data structure based on a variety of access factors to generate prioritized data structure 482. These access factors can include the physical location of a content node, a network closeness of a content node, an access latency for a content node, the ability for a content node to serve content to user communication device 410, or any other factor for prioritizing items in the data structure.

In some instances, DNS bypass computing system 450 can be configured to assist user communication device 410 in generating prioritized data structure 482. In such examples, DNS bypass computing system can collect statistics from one or more other user communication devices. These statistics can include the latency of the content nodes, the availability of the content nodes, past access success statistics of content requests by other user devices, past access latency data of other user devices, or any other relevant factor in determining a content node priority. Once the data is gathered, the data can then be combined with statistics from user communication device 410 to determine the appropriate priority within prioritized data structure 482.

Figure 5:
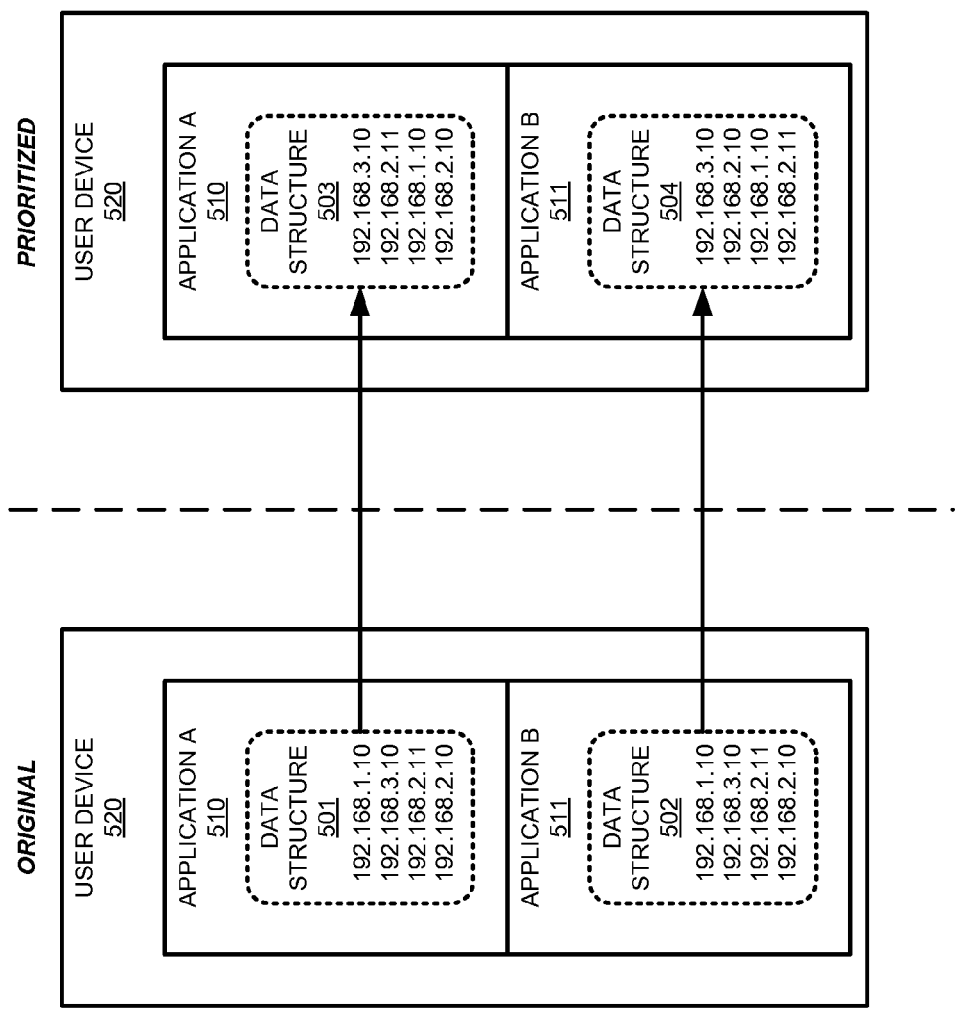
FIG. 5 is a block diagram illustrating domain name bypass data structures.

FIG. 5 is a block diagram illustrating domain name bypass data structures. FIG. 5 includes user communication device 520, application A 510, application B 511, original application A data structure 501, original application B data structure 502, prioritized application A data structure 503, and prioritized application B data structure 504. Application A 510 and application B 511 comprise applications that reside on user communication device 520. User communication device 520 can represent end user device 132, user communication device 410, or other similar device. Applications 510-511 can include a software development kit (SDK) or application programming interface (API) that allow the user device 520 to communicate with a DNS bypass system over a predefined interface framework. The SDK or API can be configured to receive and store network addresses for the one or more CNs in a bypass data structure, request network addresses for the one or more CNs, prioritize the CNs in a bypass data structure, or any other process for storing and prioritizing items within the DNS bypass structure.

Data structures 501-504 include DNS bypass information, such as network addresses for one or more content distribution nodes. These network addresses allow the application to call the appropriate content distribution node without having to make a domain name system call. Although illustrated as a list, the DNS bypass information can be stored in any other data form capable of prioritizing the network addresses. Data structures 501-504 can comprise databases, linked lists, spreadsheets, tree structures, or other data storage and prioritization structures. Data structures 501-504 can be stored with the application data on the user device storage media.

In operation, a domain name bypass system can pass DNS bypass information, including the network addresses for one or more content distribution nodes, to user communication device 520. In the present example, the network addresses are the network addresses for CNs 490-492. This information is then placed in original data structures 501-502 for application A and application B. Following the placement of the DNS bypass information, original data structures 501-502 can be prioritized based on a variety of access factors. These factors can include the physical location of a content node, the latency for a content node to respond to a request, the availability for the content node to serve content to user device 520, or any other factor for prioritizing items in the data structures. Once prioritized, the network addresses can then be placed in prioritized data structures 503-504.

As illustrated in FIG. 5, the top priority network address for application A 510 is 192.168.3.10, as illustrated in data structure 503, and the top priority network address for application B 511 is 192.169.3.10, as illustrated in data structure 504. Upon a user instruction requesting content for either application A 510 or application B 511, user device 520 will process data structure 503 or data structure 504 to retrieve the top priority network address. This top priority network address will then be used to request the appropriate content from the corresponding content node. In some instances, the content node cannot respond to a request of the user device because the content node is unavailable. In such examples, the user device can then move to lower priority network addresses until the request is fulfilled. The user device can then adjust the priority in data structures 503-504 based on the latency or availability during the content request.

Prioritizing the data structures can occur on a given period such as every ten minutes, every time a new content node is made available to the user device, every time the application is executed on the device, or any other systematic or periodic update schedule. Further, user device 520 can be updated with new and discontinued content nodes on a given time period, every time the user initiates the application, or any other systematic or periodic update for available content nodes.

The included descriptions and figures depict specific implementations to teach those skilled in the art how to make and use the best mode. For the purpose of teaching inventive principles, some conventional aspects have been simplified or omitted. Those skilled in the art will appreciate variations from these implementations that fall within the scope of the invention. Those skilled in the art will also appreciate that the features described above can be combined in various ways to form multiple implementations. As a result, the invention is not limited to the specific implementations described above, but only by the claims and their equivalents.

What is claimed is:

1. A method of operating a user communication device, the method comprising:
   maintaining a domain name system bypass data structure on the user communication device, wherein the domain name system bypass data structure comprises network addresses for content nodes of a content delivery network, the content nodes configured to cache content from at least one origin server for a user application on the user communication device, and wherein the network addresses are prioritized based on accessibility factors for the network addresses tested at least partially on the user communication device;
   receiving a user instruction requesting new content within the user application of the user communication device;
   in response to the user instruction, processing at least the domain name system bypass data structure on the user communication device to identify a network address in the network addresses for retrieving the new content; and
   requesting the new content from a content node using the network address.

2. The method of claim 1, wherein the accessibility factors comprise at least latency and availability for each of the network addresses.

3. The method of claim 1, wherein identifying the network address comprises identifying the network address with highest priority of the network addresses.

4. The method of claim 1, wherein maintaining the domain name system bypass data structure comprises:
receiving domain name system bypass information from a bypass system, wherein the domain name system bypass information comprises the network addresses for the content nodes;
storing the domain name system bypass information into the domain name system bypass data structure; and
prioritizing the domain name system bypass data structure based on at least a testing of latency and availability of the network addresses.

5. The method of claim 1, wherein maintaining the domain name system bypass data structure on the user communication device comprises receiving at least a portion of the accessibility factors for each of the network addresses from a bypass system.

6. The method of claim 1, wherein maintaining the domain name system bypass data structure on the user communication device comprises generating tests of latency and availability for each of the network addresses and prioritizing the network addresses based on the tests.

7. The method of claim 1, wherein the accessibility factors comprise at least geographic location information for each of the network addresses.

8. A system for domain name system bypass, the system comprising:
a storage system that stores program instructions; and
a processing system coupled to the storage system configured to execute the program instructions to:
maintain a domain name system bypass data structure on the user communication device, wherein the domain name system bypass data structure comprises network addresses for content nodes of a content delivery network, the content nodes configured to cache content from at least one origin server for a user application on the user communication device, and wherein the network addresses are prioritized based on accessibility factors for the network addresses tested at least partially on the user communication device;
receive a user instruction requesting new content within the user application on the user communication device;
in response to the user instruction, process at least the domain name system bypass data structure on the user communication device to identify a network address in the network addresses for retrieving the new content; and
request the new content from a content node using the network address.

9. The system of claim 8, wherein the accessibility factors comprise at least latency and availability for each of the network addresses.

10. The system of claim 8, wherein the processing system configured to execute the program instructions to process at least the domain name system bypass data structure on the user communication device to identify the network address in the network addresses for retrieving the new content is configured to execute the program instructions to identify the network address with a highest priority of the network addresses.

11. The system of claim 8, wherein the content request does not comprise a user entry of a domain name.

12. The system of claim 8, wherein the processing system configured to execute the program instructions to maintain the domain name system bypass data structure on the user communication device is configured to execute the program instructions to receive at least a portion of the accessibility factors for each of the network addresses from a bypass system.

13. The system of claim 8, wherein the processing system configured to execute the program instructions to maintain the domain name system bypass data structure on the user communication devices is configured to execute the program instructions to generate tests of latency and availability for each of the network addresses and prioritize the network addresses based on the tests.

14. An apparatus to assist in routing communications on a user communication device, the apparatus comprising:
at least one non-transitory computer readable media;
program instructions stored on the at least one computer readable media that, when executed by a processing system, direct the processing system to:
maintain a domain name system bypass data structure on the user communication device, wherein the domain name system bypass data structure comprises network addresses for content nodes of a content delivery network, the content nodes configured to cache content from at least one origin server for a user application on the user communication device, and wherein the network addresses are prioritized based on accessibility factors for the network addresses tested at least in partially on the user communication device;
receive a user instruction requesting new content within the user application on the user communication device;
in response to the use, instruction, process at least the domain name system bypass data, structure on the user communication device to identify a network address in the network addresses for retrieving the new content; and
request the new content from a content node using the network address.

15. The apparatus of claim 14, wherein the accessibility factors comprise at least latency and availability factors for each of the network addresses.

16. The apparatus of claim 14, wherein the program instructions to process at least the domain name system bypass data structure on the user communication device to identify the network address in the network addresses for retrieving the new content direct the processing system to identify the network address with the highest priority of the network addresses.

17. The apparatus of claim 14, wherein the program instructions to maintain the domain name system bypass data structure on the user communication device direct the processing system to receive at least a portion of the accessibility factors for each of the network addresses from a bypass system.

18. The apparatus of claim 14, wherein the program instructions to maintain the domain name system bypass data structure on the user communication device direct the processing system to generate tests of latency and availability for each of the network addresses and prioritizing the network addresses based on the tests.

* * * * *

UNITED STATES PATENT AND TRADEMARK OFFICE
CERTIFICATE OF CORRECTION

Page 1 of 1

PATENT NO. : 9,509,596 B2
APPLICATION NO. : 14/297098
DATED : November 29, 2016
INVENTOR(S) : Artur Bergman et al.

It is certified that error appears in the above-identified patent and that said Letters Patent is hereby corrected as shown below:

On the Title Page (73), Assignee, Line 1, Replace "Fasly" with --Fastly--

Signed and Sealed this
Third Day of March, 2020

Andrei Iancu
*Director of the United States Patent and Trademark Office*